United States Patent [19]

Yoo

[11] Patent Number: 6,024,992

[45] Date of Patent: *Feb. 15, 2000

[54] ENHANCED KIMCHI MIX COMPOSITION

[76] Inventor: Byong W. Yoo, 1929 Gomes Rd., Fremont, Calif. 94539

[ * ] Notice: This patent is subject to a terminal disclaimer.

[21] Appl. No.: 09/080,153

[22] Filed: May 18, 1998

[30] Foreign Application Priority Data

Jun. 13, 1997 [KR] Rep. of Korea ................. 97-24606

[51] Int. Cl.⁷ .................................................. A23L 1/303
[52] U.S. Cl. ................... 426/72; 426/49; 426/74; 426/534; 426/650
[58] Field of Search .................. 426/72, 7, 49, 426/73, 638, 74, 534, 262, 650

[56] References Cited

U.S. PATENT DOCUMENTS 5,422,127  6/1995  Dube et al. ........................ 426/73
5,520,933  5/1996  Yoshida et al. ..................... 426/34

Primary Examiner—David Lacey
Assistant Examiner—Hao Mai
Attorney, Agent, or Firm—Aquilino, Welsh & Flaxman

[57] ABSTRACT

A Kimchi mix composition having a spice mix, vitamin C at an organic acid. The vitamin continue is either ascorbic acid, calcium ascorbic or sodium ascorbic. The organic acid is either malic acid, citric acid, fumaric acid, stannic acid, succinic acid or mixtures thereof. The vitamin C and the organic acid are present at an amount of 0.5–30% by weight and 0.5–5% by weight, respectively, based on the total weight of the spice mix. The spice mix can include salt, pepper powder, onion powder, garlic powder, mustard powder, paprika powder, kelp powder, ginger powder, seaweed powder, apple powder, fish powder, monosodium glutamate, sesame powder, or mixtures thereof.

5 Claims, No Drawings

ENHANCED KIMCHI MIX COMPOSITION

BACKGROUND OF THE INVENTION

1. Field of the Invention

The present invention relates to a Kimchi mix composition with which housewives or cooks can easily prepare Kimchi and which prevents the Kimchi from giving nitrosoamine, a carcinogen, in the stomach.

2. Description of the Prior Art

Many reports disclose that there is a relation between stomach cancer and fermented vegetable foods, such as Kimchi, which are mixed with stimulating spices including salt and powdered red pepper. For instance, it is written in Surgeon General's reports of the U.S. Department of Health and Human Services that, when a lot of the fermented foods are taken in, they may cause stomach cancer because, in the course of vegetable fermentation, such as under the condition of pickling vegetables into Kimchi, the nitrate within the vegetables is converted into nitrosamine, a known carcinogen, and other nitrogen compounds by the action of zymogens in the body.

Nitrate is contained in vegetables at a considerable amount and thus, it is accumulated in the human body when taken in. Ingestion of raw vegetables, however, is known to have nothing to do with stomach cancer even if the intake of nitrate is large (Pobel et al. 1995). On the other hand, Morales, et al., 1995, reported that the drinking water in Spain contains a considerable amount of nitrate and the nosagenic rate of stomach cancer is high to the in Spain. This contrary result is deduced to have something to do with vitamin C: when raw vegetables are eaten, vitamin C, together with nitrate, are taken in and plays a role as an antioxidant in the body. Whereas, the tap water of Spain contains little vitamin C and fermented vegetables, such as Kimchi, lack vitamin C.

Some scientists would lay emphasis on the role of salt in causing stomach cancer (Nutrition and Stomach Cancer, Cancer Cause and Control 1996, 7 pp41–55, Kono et al.). However, it is now accepted that nitrate and salt cause stomach cancer in combination.

According to recent research of International Epidemiological Association concerning death owing to stomach cancer for men and women in 24 countries (International Journal of Epidemiology, 1996, Joossens et al.), Korean men stand first on the list of the death rate, Japanese second and Chinese next. It was reported that, of the peoples in the 24 countries researched, Koreans are first in nitrate intake, the Chinese second and the Japanese fourth. Reportedly, Koreans also rank first in salt intake, the Chinese fourth, and the Japanese tenth. The peoples of Spain, France and Canada, who are reported to ingest, in average, salt 20% less than do the people of Korea, show a death rate owing to stomach cancer less than a quarter of the death rate of Koreans. The three countries' peoples take in nitrate at an amount less than by 60% than do Koreans. Canadians take in salt 6% more than, but nitrate a quarter as much as do the Japanese and the death rate of Canadians owing to stomach cancer is one-fifth of that of the Japanese. The Spanish and the French are higher in salt intake than the Japanese but take in nitrate at an amount less than by 40% than and show a death rate owing to stomach cancer less than by 60% than do the Japanese. Thus, Koreans and the Japanese are both certainly more exposed to the danger of nitrate than any other peoples because the peoples of both countries take in a lot of fermented vegetables.

The research report, supra, reveals that Koreans take in the most salt and fermented vegetables in the world and no other people in the world have so high a nosagenic rate of stomach cancer as Koreans. The Korean death rate owing to stomach cancer is ten times as large as the Americans' and higher by 70% than the Japanese's, the second in the world. Indeed, the nitrate intake of Koreans comes mainly from Kimchi, a staple food of Korea, made of salted cabbage. This report also shows that salt is a necessary condition, but not alone enough of a contributor to cause stomach cancer and that nitrate, when entering the body as it is contained in not raw vegetables, but fermented vegetables, may act as a cause of stomach cancer in a complex mechanism together with salt. In the case of Kimchi, vitamin C is destroyed during its fermentation so that the nitrate therein has a great influence on the nosagenic rate of stomach cancer, in combination with the salt.

SUMMARY OF THE INVENTION

Therefore, it is an object of the present invention to overcome the above problems encountered in prior arts and to provide a Kimchi mix composition which can prevent the conversion of nitrate into deleterious substances in the stomach as well as the infection with Helicobactor pyroli, a bacterium causing stomach diseases, such as gastritis, peptic ulcer and stomach cancer.

In accordance with the present invention, the above object could be accomplished by a provision of a Kimchi mix composition comprising a spice mix, vitamin C and organic acid.

DETAILED DESCRIPTION OF THE INVENTION

In the U.S.A., the nosagenic rate of stomach cancer has been remarkably reduced since the 1930s. Reportedly, the reason of the reduced rate was that Americans eat a lot of vitamin C each year with their meals (Weisburger J. H., "Mechanism of Action of Diet as a Carcinogen", Cancer 1979). It was published that patients suffering from stomach cancer were only 2% of the total cancer patients in U.S.A. (Passwater R. A, Cancer Prevention and Nutritional Therapise p 20, 1993).

Vitamin C, one of the necessary nutrients, is known to be helpful in the prevention and treatment of cancer, the reduction of blood pressure and cholesterol content, and the therapy of various diseases including peptic ulcer, gastritis, hepatitis and colds (Goodman S, Vitamin C, The Master Nutrient 11, 1991). In addition, this nutrient is able to neutralize aflatoxin, the toxin produced by some strains of the fungus Aspergillus flavus, the most potent carcinogen yet discovered, which can cause hepatitis. Vitamin C does not deleteriously affect the human body within a dose of 20 g a day for an adult (Challem J. J. Vitamin C, updated p 9, Keats pub. co., 1983). In the U.S.A. and Australia, about 20% of people in their twenties and about 50% of people in their fifties are infected with Helicobactor pylori (hereinafter referred to as "HP"), a bacterium known to be directly related to causing stomach diseases including cancer, ulcer and gastritis. It was reported that, in Korea, the infection rate with HP was about 50% for five-year-olds, about 80% for eight-year-olds and about 90% for people in their twenties (Youn et al., Journal of Korean Medical Science Vol. 11, No. 5, Oct. 1996). In Taiwan, 27% of children in age ten or less and 72% of people in their forties are known to be infected with HP (Teh et al.,1995). Also, Teh et al. reported that the inhabitants who dwell with the natives of Taiwan are high in stomach cancer death rate with the infection rate with HP of 63% while urban dwellers are low in stomach cancer death rate with the infection rate with HP of 40%.

Many articles concerning the relation between vitamin C and HP are published. For instance, Youn et al., revealed in 1996 that, for HP-infected persons, vitamin C acts as a factor preventing gastritis. According to Farinati et al. (1996), the vitamin C in the gastric juice of the patients suffering from gastritis is less than that of normal persons. Drake et al. (1996) reported that 37 persons of 82 patients suffering from gastritis were related to HP and that vitamin C acted to prevent the progress of gastritis to stomach cancer. On the basis of their research results, Fontham et al. argued in 1995 that the intake of antioxidant, such as vitamin C, is in inverse proportion to the nosagenic rate of atrophic gastritis and vitamin C is helpful in reducing and treating gastritis. In the U.S. general Reports (U.S. Department of Health and Human Service, 1988), it is written that vitamin C has a medicinal function of preventing nitrate and nitrite from being converted to carcinogens, so that it can reduce the nosagenic rate of stomach cancer.

In order to prevent a certain disease, one may additionally take vitamins. For example, a person may purchase and take vitamins C and E regularly, with the aim of preventing stomach cancer, but it is not convenient. According to Times published on May, 1997, 43% of Americans purchase and take vitamins, additionally.

Recently, as a commercial strategy, food goods added with the nutrients which the food itself lacks, have been put on the market. For example, a lot of commercially available milk goods are reinforced with vitamins A and D and the bread on the market has various extraneous vitamins and minerals. These principal or staple foods may be conducive to the health of the consumers.

As described above, the dietary life of Koreans gives grounds to the highest nosagenic rate of stomach cancer. That is, Koreans take salt and nitrate more than do any other people. In addition, the infection rate of Koreans with HP is the highest in the world. Moreover, Koreans generally like hot or spicy tastes, so that the mucous membranes of their stomachs are under a deleterious condition.

It is an established theory that eating raw vegetables as much as possible and fermented vegetables, such as Kimchi, as little as possible is effective for reducing the probability of stomach cancer. However, it is very difficult for a person to change his (or her) taste to which he (or she) gets accustomed. Much more, a traditional food diet is difficult to change. For instance, Kimchi is served at almost every meal for Koreans. Thus, it is desirable that a fermented vegetable food, if it is a traditional food like Kimchi for the Korean people, is made to contain much vitamin C, so that the vitamin C counteracts nitrate, nitrogen compounds, HP bacteria and.

The present invention pertains to a Kimchi mix composition with which Kimchi can be prepared to have a high content of vitamin C. The Kimchi mix composition of the invention comprises a spice mix, vitamin C, and organic acid. The spice mix comprises salt, pepper powder, onion powder, garlic powder, mustard powder, paprika powder, kelp powder, ginger powder, seaweed powder, apple powder, fish powder, monosodium glutamate, sesame powder, and the mixtures thereof and the organic acid is selected from malic acid, citric acid, fumaric acid, stannic acid, succinic acid and the mixtures thereof. In the Kimchi mix composition, vitamin C and organic acid are contained at an amount of about 0.5–30% by weight and about 0.5–5% by weight, respectively, on the basis of the weight of the spice mix. Optionally, the Kimchi mix further comprises vitamin E an amount of about 1–10% by weight based on the weight of vitamin C.

Celery cabbage and radish are the fundamental garden stuffs for preparing Kimchi. These vegetables contain the phytochemicals or phytonutrients helpful for good health. For example, celery cabbage and radishes are themselves rich in vitamin C, but while they are processed into Kimchi via preserving with salt and washing, water-soluble vitamin C is washed away along with the salt water. In addition, it is reported that the fermentation of vegetables is accompanied with the destruction of the vitamin C the vegetables contain (Seel, D. J., et al., Food Chem. Toxic Vol. 12, pp 1117–1123, 1994). Therefore, Kimchi generally lacks vitamin C.

A better understanding of the present invention may be obtained in light of the following experiments which are set forth to illustrate, but are not to be construed to limit the present invention.

Loss of Vitamin C from Celery Cabbage

When celery cabbage was preserved with salt, the loss of water-soluble vitamin C from the celery cabbage was deduced by measuring the water exuded in the action of osmosis. To this end, celery cabbage weighing 200 g was cut into a size of 1 cm, added with 8 g of salt and mixed together in a vinyl pack. After 22 hours, the water separated from the cabbage was measured. This procedure was repeated using other materials, instead of salt. The results are given as shown in Table 1 below.

TABLE 1

Exuded Water from Cabbage Depending on Additives

| Additives | Amounts (g)/Cabbage 200 g | Exuded Water (g) |
| --- | --- | --- |
| NaCl | 8 | 76.5 |
| KCl | 8 | 78.5 |
| $MgSO_4$ | 8 | 52.5 |
| $CaCl_2$ | 8 | 81.5 |
| Whey | 8 | 22.5 |
| Sugar | 8 | 26 |
| Fructose | 8 | 56 |
| Ascorbic Acid | 8 | 75 |
| Na Ascorbate | 8 | 74 |
| Ca Ascorbate | 8 | 55 |
| $MgCl_2$ | 8 | 78 |
| K citrate | 8 | 69 |
| Vitamin E | 8 | 0 |
| Bean Powder | 8 | 0 |

The data showed that potassium chloride (KCl), calcium chloride ($CaCl_2$) and magnesium chloride ($MgCl_2$) produced more water separated from celery cabbage than did salt (NaCl). According to the data, 76.5 g of water was exuded from 200 g of celery cabbage by the osmosis action of 8 g of salt. When this water is completely drained off, the wasted content of cabbage, containing phytonutrients and vitamin C, amounts to 38% by weight in total.

In the case of preserving a whole head of cabbage with salt, the water loss, although not amounting to 38% of the total weight of the cabbage, must be a considerable amount. Indeed, vitamin C is contained at 45 mg per 100 g of celery cabbage and if the loss rate is only 50% a large amount of nutrient is wasted.

In either case, vitamin C and other phytonutrients are wasted together with the salty water exuded out. The Kimchi which is prepared by mixing cleaned and chopped cabbage with the Kimchi mix of the invention and aging it, however, conserves its nutrients. In addition, the Kimchi mix can provide some nutrients which may be lost during preparation.

pH of Ascorbic acid or Ascorbate Solution

After being added with lactic acid, unripened Kimchi was aged. A pH measurement revealed the Kimchi was of more acidity. The lowered pH is attributed to the fact that lactic acid is produced during the fermentation of Kimchi. However, if the acidity reaches a certain value, the fermentation is restricted.

It is known that the acidity of Kimchi which makes Kimchi most delicious, ranges from 3.5 to 4.2. An appropriate amount of organic acid is very useful to control the fermentation and acidity of Kimchi.

In these experiments, a study on the change in acidity of Kimchi with vitamin C was performed. First, a solution of ascorbic acid, calcium ascorbate or sodium ascorbate in filtered tap water was measured for pH. Then, the pH change of Kimchi depending on the addition of ascorbic acid, calcium ascorbate and sodium ascorbate was monitored and the results are given as shown in Table 2, below.

TABLE 2 pH Change with Vitamin C

| Ascorbic Acid | pH | Ca Ascorbate | pH | Na Ascorbate | pH |
|---|---|---|---|---|---|
| 0 | 5.5 | 0 | 5.5 | 0 | 5.5 |
| 0.25% | 3.5 | 0.25% | 6 | 0.25% | 5.6 |
| 0.50% | 3.2 | 0.50% | 6.2 | 0.5% | 6.0 |
| 0.75% | 2.9 | 0.75% | 6.2 | 0.75% | 6.1 |
| 1.00% | 2.5 | 1.00% | 6.2 | 1.00% | 6.2 |
| | | 1.5% | 6.2 | 1.50% | 6.3 |
| | | 2.0% | 6.4 | 2.00% | 6.3 |

While the ascorbic acid solution is acidic, the calcium ascorbate or sodium ascorbate solution is near neutral in acidity. During the aging of Kimchi, if the circumstance is acidic, Kimchi is not excessively fermented. Thus, ascorbic acid can hinder the fermentation of Kimchi. As shown in Table 2, the 0.25% ascorbic acid solution has a pH of 3.5 and the tap water has no buffering effect.

pH Change of Cabbage with Ascorbic Acid

To detect the buffering effect of celery cabbage and salt on the acidity of ascorbic acid, pH was measured after ascorbic acid was mixed with salted cabbage. 500 g of chopped cabbage was mixed with 10 g of salt and then, with ascorbic acid, vitamin C.

TABLE 3

Buffering Effect According to Ascorbic Acid Addition

| Amount of Ascorbic Acid (wt %) | pH |
|---|---|
| 0 | 5.8 |
| 0.1 | 5.2 |
| 0.2 | 4.2 |
| 0.3 | 4.1 |
| 0.4 | 4.0 |
| 0.5 | 3.9 |
| 0.6 | 3.8 |
| 0.75 | 3.7 |
| 1.0 | 3.5 |
| 1.5 | 3.3 |

Cabbage + 0.5% Ascorbic Acid + 0.05% Tartaric Acid pH 3.4
+0.05% Fumaric Acid pH 3.4
+0.05% Citric Acid pH 3.4
+0.05% Malic Acid pH 3.4

The data of Table 3 show that instant Kimchi with pH 3.5–3.9 can be prepared by adding ascorbic acid at an amount of 0.5–1.0%. The acidity of Kimchi can also be controlled with organic acid. For example, instant Kimchi can be prepared to have pH 3.4 by adding ascorbic acid at an amount of 0.5% and an organic acid at an amount of 0.2% selected from malic acid, citric acid, fumaric acid, stannic acid, succinic acid and the mixtures thereof, at an amount of 0.05%.

Kimchi Mix Preparation

The Kimchi mixes which are currently sold on the market in the U.S. generally comprise salt, sugar, fish powder, pepper powder, garlic powder and ginger powder. These basic Kimchi spice ingredients are combined to give a Kimchi taste but not prepared in consideration of the health of the consumers. That is, they cannot prevent the Kimchi from giving a carcinogen during aging or in the stomach, nor aid the Kimchi to act against HP found in patients suffering from gastritis, peptic ulcer and stomach cancer.

The Kimchi mixes listed on Table 4 below are supplemented with vitamin C, aiming at preventing the Kimchi from giving a carcinogen during aging or in the stomach and at making the consumers free from the danger of stomach cancer.

TABLE 4

Kimchi Mixes for 1000 g of Vegetable Stuff

| Ingredients | Control | Mix 1 | Mix 2 | Mix 3 |
|---|---|---|---|---|
| Salt | 25 g | 25 g | 25 g | 25 g |
| Pepper Powder | 10 g | 10 g | 10 g | 10 g |
| Onion Powder | 5 g | 5 g | 5 g | 5 g |
| Garlic Powder | 5 g | 5 g | 5 g | 5 g |
| Ascorbic Acid | 0 g | 10 g | 0 g | 0 g |
| Ca Ascorbate | 0 g | 0 g | 10 g | 0 g |
| Na Ascorbate | 0 g | 0 g | 0 g | 5 g |
| Cabbage | 1000 g | 1000 g | 1000 g | 1000 g | pH Change with Time

| Time | Control | Mix 1 | Mix 2 | Mix 3 |
|---|---|---|---|---|
| After 30 min | 5.8 | 3.5 | 5.8 | 5.8 |
| After 24 hours | 5.5 | 3.8 | 5.5 | 5.5 |
| After 36 hours | 4.1 | 3.8 | 4.5 | 4.1 |
| After 48 hours | 3.5 | — | 3.8 | 3.7 |
| After 60 hours | 3.5 | — | 3.8 | 3.6 |

As apparent from the data, the Kimchi prepared with the Kimchi mix containing ascorbic acid showed high acidity and ceased to ferment. The addition of ascorbic acid at an amount of 1% was useful to prepare delicious instant Kimchi. When added with 1% of calcium ascorbate or 0.5% of sodium ascorbate, the Kimchi was fermented slower than when added with the control.

TABLE 5

Kimchi Mixes for 1000 g of Vegetable Stuff

| Ingredients | Mix 4 | Mix 5 | Mix 6 | Mix 7 |
|---|---|---|---|---|
| Salt | 10 g | 20 g | 30 g | 40 g |
| Pepper Powder | 10 g | 10 g | 10 g | 10 g |
| Onion Powder | 5 g | 5 g | 5 g | 5 g |
| Garlic Powder | 5 g | 5 g | 5 g | 5 g |
| Ginger Powder | 1 g | 1 g | 1 g | 1 g |
| Paprika | 5 g | 5 g | 5 g | 5 g |
| Na Ascorbate | 5 g | 5 g | 5 g | 5 g |
| Cabbage | 1000 g | 1000 g | 1000 g | 1000 g |

TABLE 5-continued

Kimchi Mixes for 1000 g of Vegetable Stuff pH Change with Time

| Time | Mix 4 | Mix 5 | Mix 6 | Mix 7 |
|---|---|---|---|---|
| After 36 hours | 4.4 | 4.6 | 5.2 | 5.3 |
| After 48 hours | 3.8 | 3.8 | 4.2 | 5.0 |
| After 72 hours | 3.6 | 3.6 | 3.6 | 3.8 |
| After 96 hours | 3.4 | 3.5 | 3.6 | 3.6 |

When added with salt at an amount of 1–2% (Mixes 4 and 5), the Kimchi was fermented more during 48 hours than when added with salt at an amount of 3–4% (Mixes 6 and 7) but the Kimchi came to have almost the same pH values after 72 hours. That is, such a high concentration of salt restricts the activity of the bacteria which may be present in the Kimchi stuffs and finally gives the Kimchi the same acidity with those of low concentrations of salt. Within 4%, salt concentration does not have a critical influence on the fermentation of Kimchi.

TABLE 6

Kimchi Mixes for 1000 g of Vegetable Stuff

| Ingredients | Mix 8 | Mix 9 | Mix 10 | Mix 11 |
|---|---|---|---|---|
| Salt | 25 g | 25 g | 25 g | 25 g |
| Pepper Powder | 10 g | 10 g | 10 g | 10 g |
| Onion Powder | 5 g | 5 g | 5 g | 5 g |
| Garlic Powder | 5 g | 5 g | 5 g | 5 g |
| Ginger Powder | 1 g | 1 g | 1 g | 1 g |
| Paprika | 5 g | 5 g | 5 g | 5 g |
| Na Ascorbate | 5 g | 5 g | 5 g | 5 g |
| Sugar | 0 g | 20 g | 40 g | 60 g |
| Cabbage | 1000 g | 1000 g | 1000 g | 1000 g | pH Change with Time

| Time | Mix 8 | Mix 9 | Mix 10 | Mix 11 |
|---|---|---|---|---|
| After 36 hours | 4.8 | 5.2 | 4.8 | 5.2 |
| After 48 hours | 3.8 | 3.6 | 3.6 | 3.8 |
| After 72 hours | 3.5 | 3.5 | 3.5 | 3.6 |
| After 96 hours | 3.5 | 3.5 | 3.5 | 3.5 |

1000 g of cabbage was mixed with a Kimchi mix comprising sugar at an amount of 0, 2, 4 and 6% by weight based on the weight of cabbage. After aging for 48 hours, the Kimchi thus prepared came to have almost the same pH value irrespectively of sugar concentrations. Within 6%, sugar concentration does not have a critical influence on the fermentation of Kimchi.

Kimchi Mix supplemented with Vitamin C

When 1000 g of Kimchi is prepared with the Kimchi mix comprising 5 g of sodium ascorbate, if an adult eats 200 g of the Kimchi a day, he (she) takes in 1 g of sodium ascorbate. Since 1000 mg of sodium ascorbate consists of 890 mg of ascorbic acid and 110 mg of sodium, 200 g of the Kimchi prepared with a Kimchi mix of the invention contains vitamin C almost 15 times as much as the necessary amount a day for adults. For children, the Kimchi prepared with a Kimchi mix of the invention can provide vitamin C several times as much as the daily necessary amount, so that they can become immune to stomach diseases including gastritis, peptic ulcer and stomach cancer.

Because Vitamin C, which is water-soluble, cannot be stored in the body, the daily necessary amount of vitamin C must be fed to the body everyday.

The Kimchi mix of the present invention may comprises 20 g of vitamin C per 1000 g of the vegetable stuff for Kimchi but preferably about 5 g of vitamin C.

1000 g of cabbage was mixed with several Kimchi mixes comprising 10–20 g of Vitamin C (calcium ascorbate) and 4 g of vitamin E and a pH measurement was performed for the Kimchi prepared.

TABLE 7

Kimchi Mixes for 1000 g of Vegetable Stuff

| Ingredients | Mix 12 | Mix 13 | Mix 14 |
|---|---|---|---|
| Salt | 25 g | 25 g | 25 g |
| Pepper Powder | 10 g | 10 g | 10 g |
| Onion Powder | 5 g | 5 g | 5 g |
| Garlic Powder | 5 g | 5 g | 5 g |
| Vitamin E | 4 g | 4 g | 4 g |
| Vitamin C | 10 g | 15 g | 20 g |
| Cabbage | 1000 g | 1000 g | 1000 g | pH Change with Time

| Time | Mix 12 | Mix 13 | Mix 14 |
|---|---|---|---|
| After 36 hours | 5.8 | 4.4 | 4.8 |
| After 48 hours | 4.8 | 4.1 | 4.1 |
| After 72 hours | 4.0 | 3.8 | 3.8 |
| After 96 hours | 3.8 | 3.8 | 3.8 |

Like vitamin C, vitamin E, which is a kind of an antioxidant, is known to play a role in restraining the production of nitrous compounds, such as nitrosoamines, in the stomach.

Taken together, the data obtained in the experiments led the inventors to the following conclusions:

1. a Kimchi mix comprising vitamin C according to the present invention allows one to prepare Kimchi easily and the danger that Kimchi might cause stomach cancer is remarkably reduced by the action of the vitamin C;
2. a Kimchi mix comprising ascorbic acid at an amount of 0.5–1.0% by weight based on the total weight of the vegetable stuff for Kimchi, is suitable for preparing instant Kimchi and leads the Kimchi to delicious taste because the absence of a buffering effect in tap water allows ascorbic acid to directly reduce the acidity of the Kimchi to pH 3.5–4.2, the pH range at which Kimchi is the most delicious;
3. a Kimchi mix according to the present invention can comprises calcium ascorbate or sodium ascorbate, both neutral in acidity, at an amount of up to 2% by weight based on the total weight of the vegetable stuff for Kimchi;
4. a Kimchi mix according to the present invention preferably comprises 0.5% of ascorbic acid and an organic acid selected from the group consisting of malic acid, citric acid, fumaric acid, stannic acid, succinic acid and the mixtures thereof; and
5. where Kimchi is prepared with a Kimchi mix comprising sodium ascorbate at an amount of 0.5% by weight based on the total weight of the vegetable stuff for Kimchi, if an adult eats 200 g of the Kimchi a day, he (she) takes in 890 mg of vitamin C everyday, which is almost 15 times as much as the necessary amount a day for adults.

As described hereinbefore, housewives or cooks engaging in the restaurants of companies, schools and etc. can easily prepare delicious Kimchi with a Kimchi mix comprising vitamin C according to the present invention. The Kimchi mix of the invention prevents the conversion of nitrate into deleterious substances, which is a serious problem in fermented Kimchi. In addition, the Kimchi mix provides enough vitamin C to avoid the danger that Kimchi might cause stomach diseases including gastritis, peptic ulcer and stomach cancer and to prevent the infection of Helicobactor pyroli. Moreover, the Kimchi mix of the invention can prevent Kimchi from being fermented excessively and control the fermentation of Kimchi, thereby leading the Kimchi to the delicious tastes right to the consumers.

The present invention has been described in an illustrative manner, and it is to be understood the terminology used is intended to be in the nature of description rather than of limitation.

Many modifications and variations of the present invention are possible in light of the above teachings Therefore, it is to be understood that within the scope of the appended claims, the invention may be practiced otherwise than as specifically described.

What is claimed is:

1. A kimchi mix composition for mixing with various vegetables prior to fermenting the vegetables to produce kimchi, comprising:

a spice mix;

a quantity of Vitamin C of approximately 0.5% to 3% by weight and a quantity of organic acid of approximately 0.5–5% by weight both on the basis of the spice mix.

2. The kimchi mix according to claim 1, wherein the organic acid is selected from the group consisting of malic acid, citric acid, fumaric acid, stannic acid, succinic acid and mixtures thereof.

3. The kimchi mix according to claim 1, wherein the Vitamin C is selected from the group consisting of ascorbic acid, calcium ascorbate and sodium ascorbate.

4. The kimchi mix according to claim 1, further including Vitamin E.

5. The kimchi mix according to claim 4, wherein the Vitamin E is present at approximately 1% to 10% by weight based upon the total weight of the spice mix.

* * * * *